US010727675B2

(12) United States Patent
Nam et al.

(10) Patent No.: US 10,727,675 B2
(45) Date of Patent: *Jul. 28, 2020

(54) SMART TABLE AND METHOD FOR OPERATING THE SAME

(71) Applicant: LG ELECTRONICS INC., Seoul (KR)

(72) Inventors: Hyeunsik Nam, Seoul (KR); Euisung Kim, Seoul (KR); Wonchul Choi, Seoul (KR); Hyunwook Moon, Seoul (KR); Byungkyu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,199

(22) Filed: Sep. 23, 2019

(65) Prior Publication Data
US 2020/0021114 A1    Jan. 16, 2020

Related U.S. Application Data

(63) Continuation of application No. 15/470,100, filed on Mar. 27, 2017, now Pat. No. 10,424,940.

(30) Foreign Application Priority Data

Mar. 28, 2016  (KR) .................. 10-2016-0036668

(51) Int. Cl.
*H02J 5/00* (2016.01)
*H02J 50/10* (2016.01)
(Continued)

(52) U.S. Cl.
CPC .............. *H02J 5/005* (2013.01); *A47B 31/02* (2013.01); *G06K 9/00892* (2013.01);
(Continued)

(58) Field of Classification Search
CPC ...................................................... H02J 7/025
(Continued)

(56) References Cited

U.S. PATENT DOCUMENTS

2006/0202665 A1   9/2006  Hsu
2007/0221668 A1*  9/2007  Baarman ............... A47J 36/321
                                                219/746
(Continued)

FOREIGN PATENT DOCUMENTS

DE   102009000273    7/2010
WO   WO2010081773    7/2010

OTHER PUBLICATIONS

Extended European Search Report in European Application No. 17163050.2, dated Jul. 26, 2017, 9 pages.
(Continued)

*Primary Examiner* — Edward Tso
*Assistant Examiner* — Ahmed H Omar
(74) *Attorney, Agent, or Firm* — Fish & Richardson P.C.

(57) ABSTRACT

A smart table is disclosed. The smart table includes a plate, an inverter configured to convert direct current (DC) power into alternative current (AC) power and to supply the AC power, a coil unit disposed below the plate and including a plurality of working coils heated by the AC power, a radio frequency identification (RFID) reader configured to recognize an RFID tag of a home appliance placed on the plate and to receive information on the home appliance from the RFID tag, and a processor configured to drive one or more of the plurality of working coils as wireless power transmission coils to perform control to transmit wireless power to the home appliance based on the received information.

19 Claims, 13 Drawing Sheets

(51) Int. Cl.
*H05B 6/06* (2006.01)
*H05B 6/12* (2006.01)
*A47B 31/02* (2006.01)
*G06K 9/00* (2006.01)
*G07F 17/32* (2006.01)
*H01F 38/14* (2006.01)
*H02J 7/00* (2006.01)
*H02J 7/02* (2016.01)

(52) U.S. Cl.
CPC ........... *G07F 17/322* (2013.01); *H01F 38/14* (2013.01); *H02J 7/0027* (2013.01); *H02J 7/025* (2013.01); *H02J 50/10* (2016.02); *H05B 6/065* (2013.01); *H05B 6/1245* (2013.01); *H05B 6/1272* (2013.01); *A47B 2200/0009* (2013.01); *H05B 2213/03* (2013.01); *H05B 2213/05* (2013.01); *Y02B 40/126* (2013.01)

(58) Field of Classification Search
USPC .......................................................... 320/108
See application file for complete search history.

(56) References Cited

U.S. PATENT DOCUMENTS

2007/0279002 A1* 12/2007 Partovi ................. H02J 7/0027
320/115
2010/0328044 A1 12/2010 Waffenschmidt et al.
2017/0245679 A1* 8/2017 Watts ...................... A47J 36/24

OTHER PUBLICATIONS

United States Office Action in U.S. Appl. No. 15/470,100, dated Dec. 31, 2018, 12 pages.

\* cited by examiner

SMART TABLE AND METHOD FOR OPERATING THE SAME

CROSS-REFERENCE TO RELATED APPLICATION

This application is a continuation of U.S. application Ser. No. 15/470,100, filed on Mar. 27, 2017, which claims benefit of Korean Patent Application No. 10-2016-0036668, filed on Mar. 28, 2016 in the Korean Intellectual Property Office, the disclosure of which is incorporated herein by reference.

BACKGROUND OF THE INVENTION

1. Field of the Invention

The present invention relates to a multipurpose table, and more particularly to a smart table with an induction heating cooking function and a wireless power transmission function.

2. Description of the Related Art

In general, a table for supporting objects or foods at home, in a restaurant, or in an office has been used.

Recently, a multipurpose table including various devices or modules in addition to simply supporting objects has been conceived.

For example, a table including cooking equipment may enhance space utilization and user convenience of a kitchen.

Various products of cooking equipment such as a microwave range using microwaves, an oven using a heater, and a cooktop have been widely popular.

In general, the cooktop heats a cooking container placed on an upper surface thereof to heat food in the cooking container and a representative example of the cooktop is a gas cooktop using gas as a heat source. The gas cooktop has degraded thermal efficiency according to high heat loss due to flame radiation and, thus, recently, interest in a cooktop using electricity has increased.

In addition, research into a table including a table with an induction heating module installed therein, for heating a metallic cooking container using electricity via an induction heating method, has been conducted.

However, a table is used for a multipurpose and is positioned in various locations at home and, thus, although an induction heating module installed in the table needs to be selectively positioned at various locations, there are problems in that a conventional table is configured in such a way that a location of an induction heating module is fixed and is not capable of being easily changed.

Research into a method for conveniently using various electronic devices that are placed and used on a table has been increasingly conducted.

SUMMARY OF THE INVENTION

Therefore, the present invention has been made in view of the above problems, and it is an object of the present invention to provide a smart table with an induction heating cooking function and a wireless power transmission function and a method for operating for the same.

It is another object of the present invention to provide a smart table for determining the information and location of a home appliance and for effectively supplying wireless power and a method for operating for the same.

It is another object of the present invention to provide a smart table for supplying wireless power even if a home appliance is moved and a method for operating for the same.

It is another object of the present invention to provide a smart table with a compact structure.

It is another object of the present invention to provide a smart table, for embodying an induction heating cooking function and a wireless power transmission function at low cost and minimizing power consumption and a method for operating for the same.

In accordance with an aspect of the present invention, the above and other objects can be accomplished by the provision of a smart table including a plate, an inverter configured to convert direct current (DC) power into alternative current (AC) power and to supply the AC power, a coil unit disposed below the plate and including a plurality of working coils heated by the AC power, a radio frequency identification (RFID) reader configured to recognize an RFID tag of a home appliance placed on the plate and to receive information on the home appliance from the RFID tag, and a processor configured to drive one or more of the plurality of working coils as wireless power transmission coils to perform control to transmit wireless power to the home appliance based on the received information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
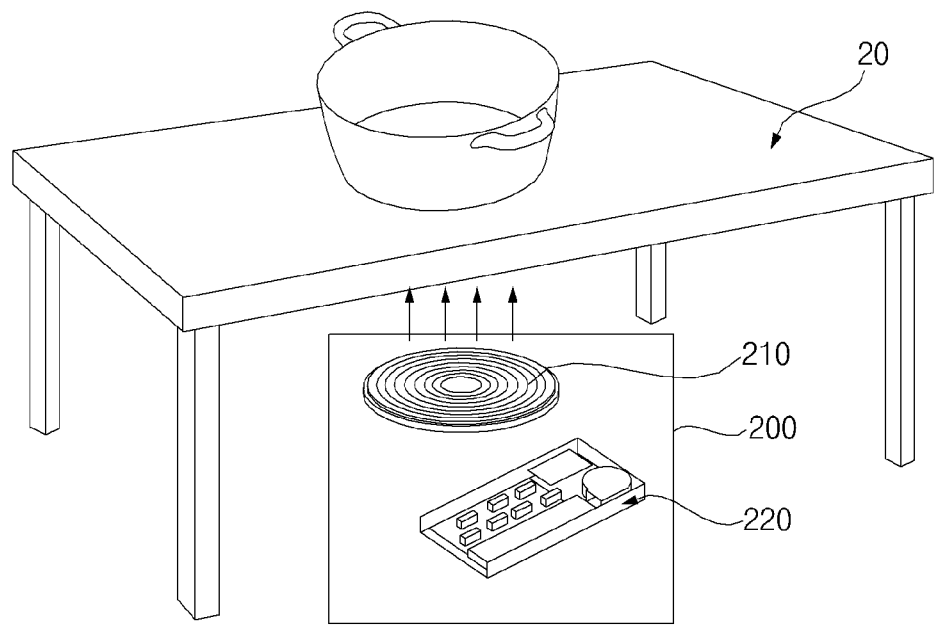
FIG. 1 is a schematic diagram of a smart table according to an exemplary embodiment of the present invention.

Exemplary embodiments of the present invention will be described with reference to the attached drawings. The invention may, however, be embodied in many different forms and should not be construed as being limited to the embodiments set forth herein.

In the drawings, for convenience and clarity of illustration, portions unrelated to description are omitted and, throughout this specification, the same reference numerals indicate the same or similar elements.

In addition, the suffixes "module" and "unit" of elements herein are used for convenience of description and do not have any distinguishable meanings or functions. Accordingly, "module" and "unit" can be used interchangeably.

FIG. 1 is a schematic diagram of a smart table 20 according to an exemplary embodiment of the present invention.

The smart table 20 according to an exemplary embodiment of the present invention may have a wireless power transmission function and an induction heating function.

As illustrated in FIG. 1, the smart table 20 may induction-heat a cooking container placed on a plate to cook food.

While the cooking container is placed on a working coil of the smart table 20, when alternative current (AC), in particular, high-frequency AC flows in the working coil, a magnetic field is generated in the working coil. According to an electromagnetic induction effect due to a magnetic field, eddy current may be induced in the cooking container. Due to the eddy current, the Joule heat may be generated from a resistance component of the cooking container to heat the cooking container.

The smart table 20 according to an exemplary embodiment of the present invention may supply wireless power to a wireless home appliance that is capable of wirelessly receiving power.

The smart table 20 according to an exemplary embodiment of the present invention and wireless home appliances may transmit/receive wireless power via a well-known wireless power transmission system, for example, via an electromagnetic induction and a magnetic resonance method.

The electromagnetic induction method uses an electromagnetic induction phenomenon in which a voltage is induced to allow current to flow when a magnetic field is changed around a conductor in which electricity flows.

The magnetic resonance method is a method in which power is transmitted according to wireless power transmission for moving electromagnetic waves to a receiver from a transmitter through an electromagnetic field when the transmitter and the receiver resonate at the same frequency. A transmission coil of the transmitter may have a predetermined resonance frequency and receive energy from a power source to generate an electromagnetic wave and, accordingly, a magnetic field may be formed. In this case, inductive power may be generated in a reception coil of the receiver according to the magnetic field.

The smart table 20 may include a wireless power transmission module 200 including a wireless power transmission (Tx) coil 210 and an inverter 220 for supplying power to the wireless power Tx coil 210, which are positioned inside or below a plate.

The wireless home appliance according to an exemplary embodiment of the present invention may include a wireless power receiver so as to receive wireless power from the wireless power Tx coil 210 through the wireless power reception coil of the wireless power receiver.

In some embodiments, the wireless power transmission module 200 may perform an induction heating function of induction heating cooking equipment during a cooking operation. In this case, the wireless power Tx coil 210 may operate as a working coil that generates a magnetic field that induction-heats an adjacent object.

The smart table 20 according to an exemplary embodiment of the present invention may wirelessly communicate with a home appliance such as cooking equipment and may be operatively associated with other devices.

Figure 2:
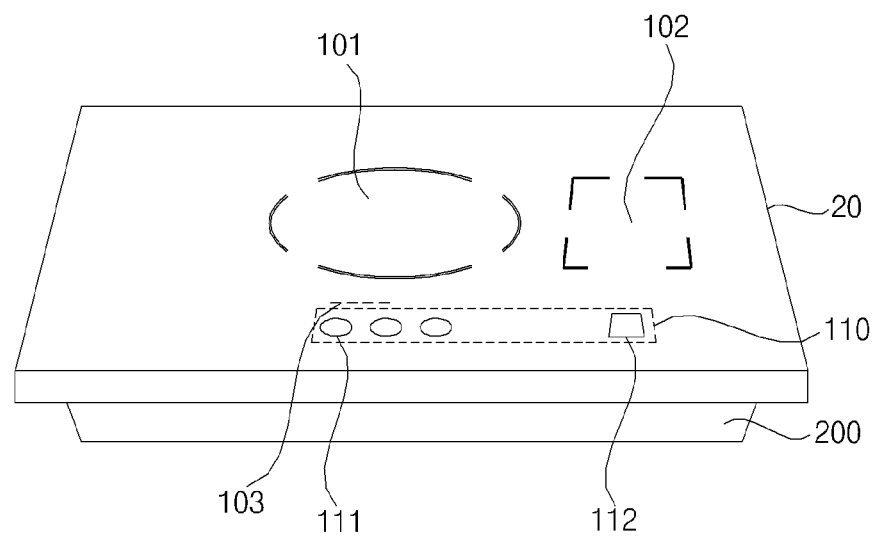
FIG. 2 is a diagram illustrating an external appearance of a smart table according to an exemplary embodiment of the present invention.

FIG. 2 is a diagram illustrating an external appearance of a smart table according to an exemplary embodiment of the present invention and illustrates a main body portion except for a leg portion of the table.

Figure 3:
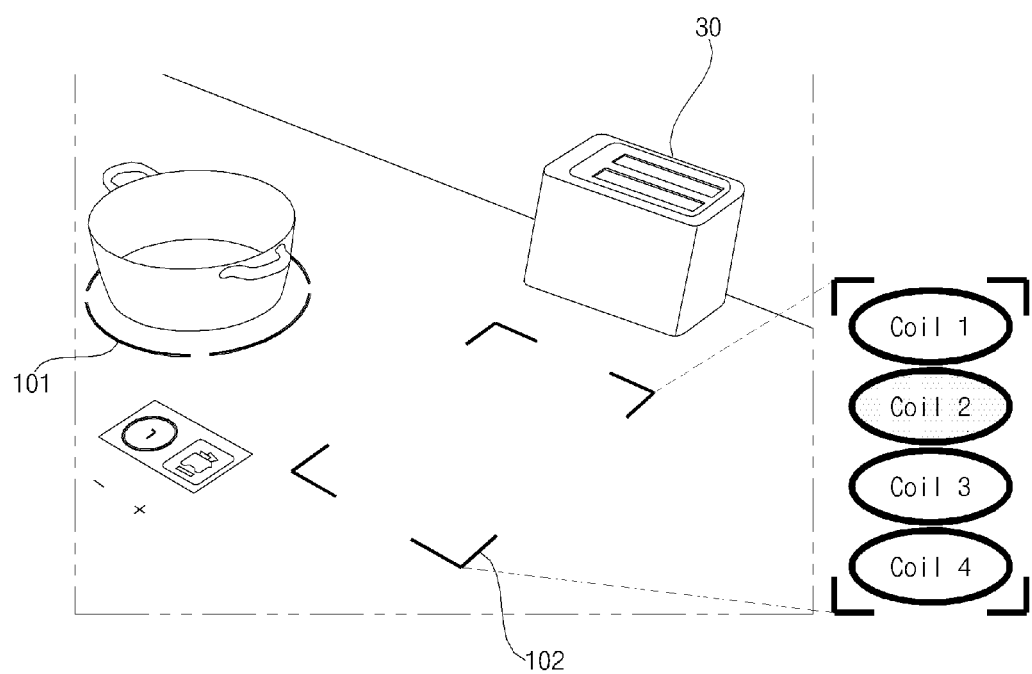
FIG. 3 is a diagram illustrating a plate and a wireless power transmission region of a smart table according to an exemplary embodiment of the present invention.

FIG. 3 is a diagram illustrating a plate and a wireless power transmission region of a smart table according to an exemplary embodiment of the present invention.

Referring to FIGS. 2 and 3, the smart table 20 according to an exemplary embodiment of the present invention may include the wireless power transmission module 200 including a wireless power transmission coil and an inverter for supplying power to the wireless power transmission coil, which are positioned inside or below a plate.

The wireless power transmission module 200 may perform an induction heating function of induction heating cooking equipment during a cooking operation.

In some embodiments, the wireless power transmission module 200 may be divided into a heating region 101 for performing the induction heating cooking function and a wireless power transmission region 102 for transmitting wireless power.

The heating region 101 and the wireless power transmission region 102 may be printed and displayed on the plate of the smart table 20 according to an exemplary embodiment of the present invention.

Transmissive/semi-transmissive regions may be formed in at least a portion of the plate of the smart table 20 and light emitted from an internal light source may be emitted upward to the transmissive/semi-transmissive regions. Each region may be displayed using the light emitted upward.

A partial region 103 of the plate of the smart table 20 may display state or operation information such as a current temperature and a current operation situation.

A manipulator 110 for receiving a user command may be disposed on the plate of the smart table 20. In some embodiments, the manipulator 110 may be divided into a heating region manipulator 111 and a wireless power transmission region manipulator 112.

Referring to FIGS. 2 and 3, a cooking container may be placed on the heating region 101 and a food may be cooked via induction heating.

When a wireless home appliance 30 that is capable of receiving wireless power is placed in the wireless power transmission region 102, the smart table 20 may transmit wireless power to the wireless home appliance 30.

A plurality of coils 1 to 4 may be disposed in the wireless power transmission region 102 and at least some coils corresponding to the size of the wireless home appliance 30 may be driven to transmit wireless power.

When the heating region 101 that performs an induction heating cooking function and the wireless power transmission region 102 that transmits wireless power are separated, it is difficult to use the respective unique regions for different purposes.

A user suffers the inconvenience of accurately using a specific space according to an executed function.

Accordingly, in terms of space utilization and user convenience, the induction heating cooking function and the wireless power transmission function may be used without separation of unique regions.

Accordingly, an exemplary embodiment of the present invention proposes a smart table using the induction heating cooking function and the wireless power transmission function without separation of regions.

Figure 4:
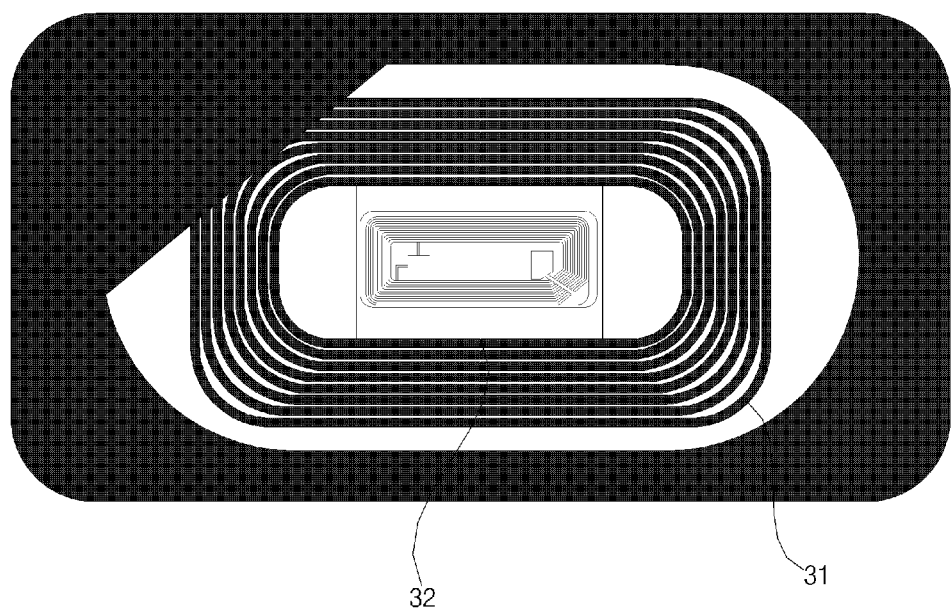
FIG. 4 is a diagram illustrating a bottom surface of a home appliance according to an exemplary embodiment of the present invention.

FIG. 4 is a diagram illustrating a bottom surface of a home appliance according to an exemplary embodiment of the present invention.

A wireless home appliance used together with a smart table according to an exemplary embodiment of the present invention may include a radio frequency identification (RFID) tag.

Referring to FIG. 4, the wireless home appliance may include a reception coil 31 and an RFID tag 32, which are disposed on the bottom surface and are used to receive wireless power. The RFID tag 32 may use a frequency of 10 MHz or more and may be formed of a material other than copper (Cu).

RFID is a technology for identifying an object using a radio frequency and is used as a method in which an RF tag including an antenna and a chip stores information and is attached to a target and, then, the information is recognized through an RFID reader.

The RFID tag may communicate with the RFID reader to wirelessly transmit data to the RFID reader. The RFID tag may be divided into an active type tag and a passive type tag according to whether a battery is installed in the tag.

The RFID reader may receive a signal containing unique information transmitted from the RFID tag 32 and recognize the RFID tag 32.

A smart table according to an exemplary embodiment of the present invention may include an RFID reader that may recognize and the RFID tag 32 and receive data.

The RFID tag 32 may include information such as a device type and required power quantity of the wireless home appliance.

The smart table may be used to transmit wireless power using the information of the recognized RFID tag 32.

Figure 5:
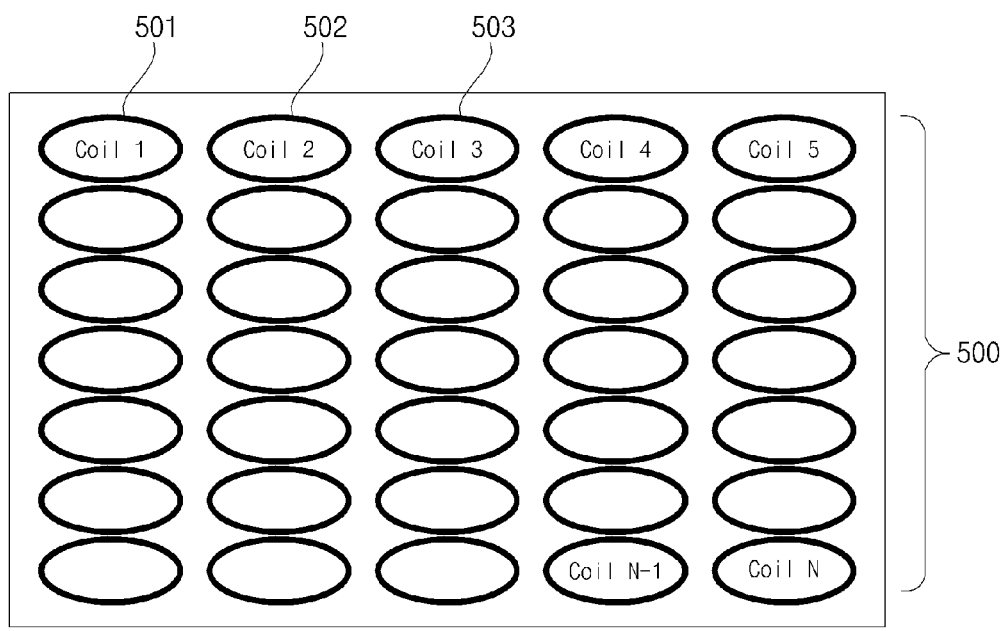
FIGS. 5 and 6 are diagrams for explanation of a coil unit according to an exemplary embodiment of the present invention.
Figure 6:
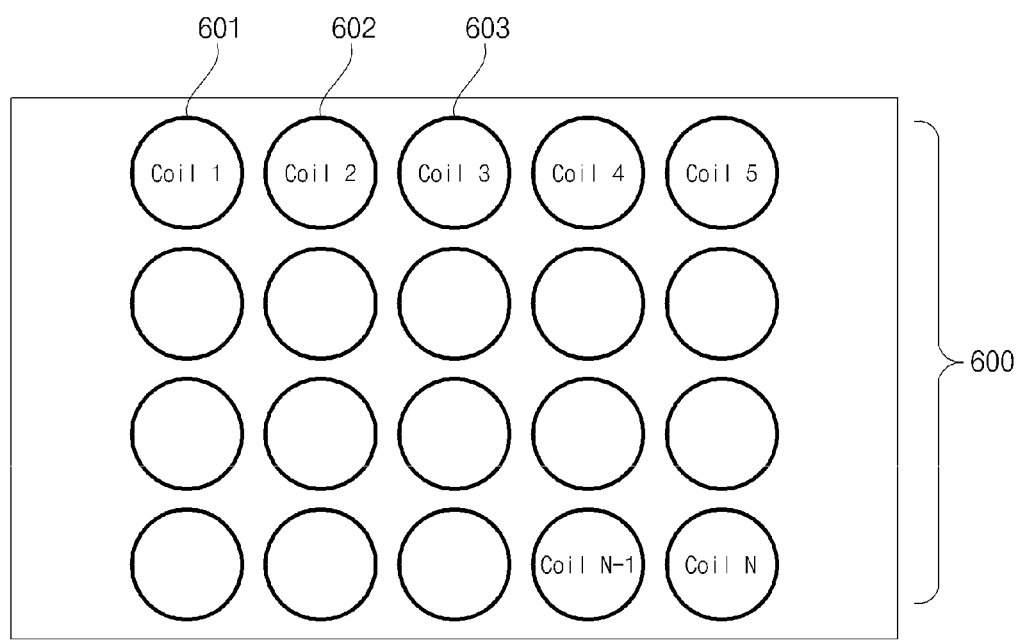

FIGS. 5 and 6 are diagrams for explanation of a coil unit 500 according to an exemplary embodiment of the present invention.

The smart table according to an exemplary embodiment of the present invention may include the coil unit 500 that is disposed below an upper surface of a plate and is heated by AC power. Here, a plurality of working coils may be positioned in a predetermined region without separation of purposes of induction heating and wireless power transmission.

Referring to FIG. 5, the coil unit 500 according to an exemplary embodiment of the present invention may include a plurality of working coils 501, 502, 503, . . . .

The smart table according to an exemplary embodiment of the present invention may drive some of the plurality of working coils 501, 502, 503, . . . of the coil unit 500 as working coils for induction heating or as transmission coils for wireless power transmission, as necessary.

Although FIG. 5 illustrates an example in which oval working coils 501, 502, 503, . . . are spaced apart from each other by a uniform interval, the present invention is not limited thereto. For example, the working coils may each be circular and an interval between some working coils may be different from an interval between other working coils.

FIG. 6 is a diagram illustrating an example of a coil unit 600 including a plurality of circular working coils 601, 602, 603, . . . .

Alternatively, the coil unit may be configured by combining circular working coils and oval working coils.

FIGS. 7 to 10 are diagrams of examples of arrangement of a working coil 710 and an RFID reader antenna 720 of a smart table according to an exemplary embodiment of the present invention.

Figure 7:
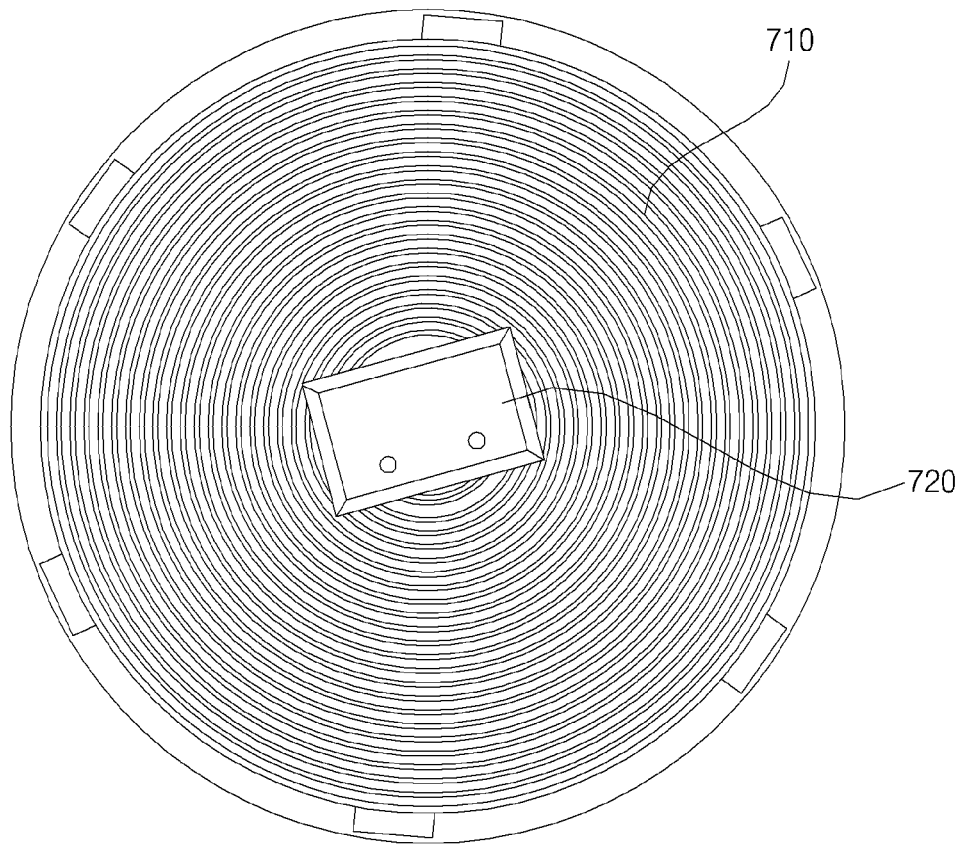
FIGS. 7 to 10 are diagrams of examples of arrangement of a working coil and an RFID reader antenna of a smart table according to an exemplary embodiment of the present invention.

Referring to FIG. 7, the RFID reader antenna 720 may be disposed above the working coil 710. In some embodiments, one RFID reader antenna 720 may be disposed to correspond to one working coil 710.

In this case, the RFID reader antenna 720 may determine whether an RFID tag is present above the corresponding working coil 710. Accordingly, according to an exemplary embodiment of the present invention, whether a wireless home appliance is present in a certain working coil may be determined according to whether the RFID tag is recognized.

In addition, the number of RFID reader antennas may be less than the number of working coils. In this case, one RFID reader antenna may correspond to a predetermined number of working coils and a distance from the RFID tag may be calculated using signal intensity or the like.

Figure 8:
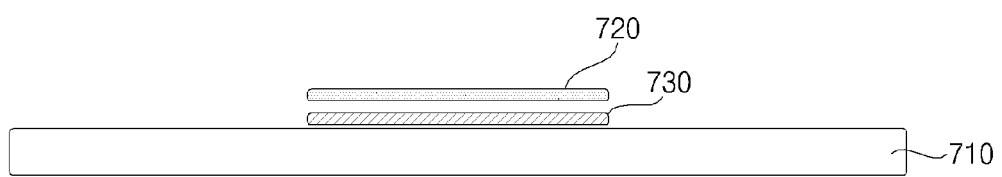
Figure 9:
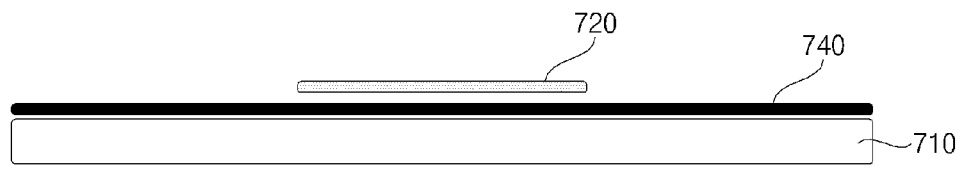

Referring to FIGS. 8 and 9, a spacer 730 or a heat insulator 740 may be disposed between the working coil 710 and the RFID reader antenna 720 according to an exemplary embodiment of the present invention.

The spacer 730 and the heat insulator 740 may be added for heat insulation from heat of the working coil 710 and to ensure a gap.

Figure 10:
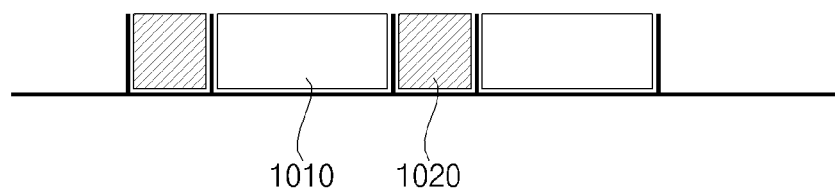

Referring to FIG. 10, an RFID reader antenna 1020 may be disposed between working coils 1010. In more detail, the RFID reader antenna 1020 may be disposed between coils that are configured as concentric circles in the working coils 1010.

Figure 11:
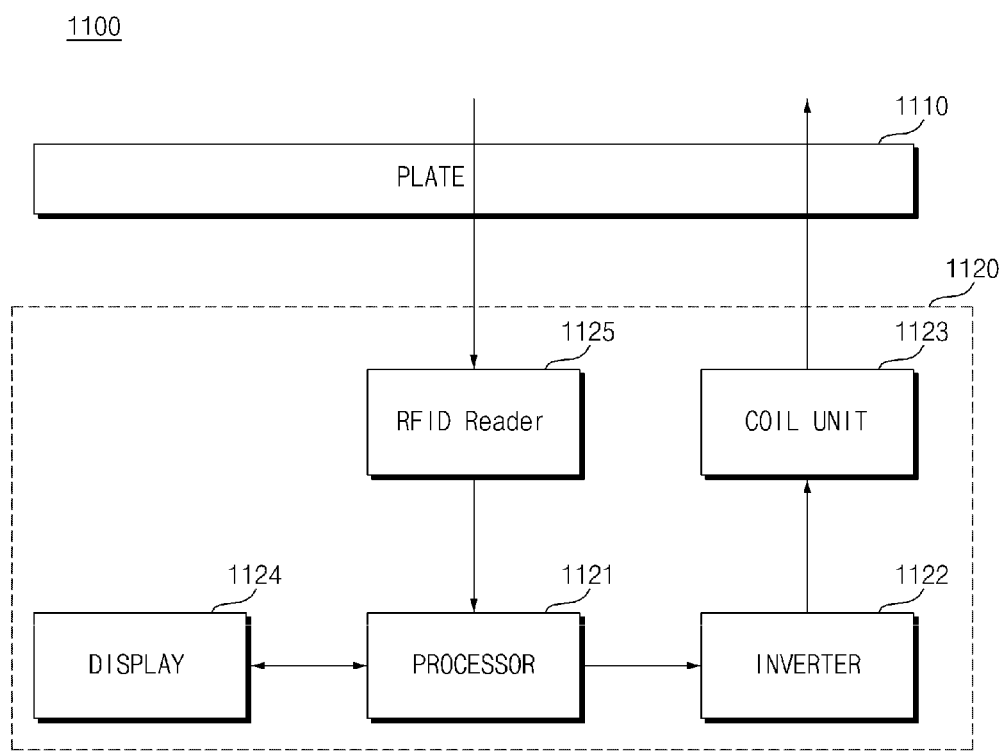
FIG. 11 is a block diagram of a smart table according to an exemplary embodiment of the present invention.

FIG. 11 is a block diagram of a smart table 1100 according to an exemplary embodiment of the present invention.

Referring to FIG. 11, the smart table 1100 according to an exemplary embodiment of the present invention may include a plate 1110 on which a wireless home appliance is placed and a wireless power transmission/induction heating module 1120 disposed in or below the plate 1110.

The wireless power transmission/induction heating module 1120 may include an inverter 1122 for converting direct current (DC) power into AC power and supplying power, a coil unit 1123 disposed below an upper surface of the plate 1110 and including a plurality of working coils heated by the AC power, an RFID reader 1125 for recognizing an RFID tag of a home appliance placed on the plate 1110 and receiving information of the home appliance from the RFID tag, and a processor 1121 for driving one or more of the plurality of working coils as wireless power transmission coils to perform control to transmit wireless power to the home appliance based on the received information.

That is, when the RFID reader 1125 recognizes an RFID tag, the processor 1121 may select some of a plurality of working coils of the coil unit 1123 and drive the selected coils as wireless power transmission coils.

The smart table according to an exemplary embodiment of the present invention may drive some of the plurality of working coils of the coil unit as working coils for induction heating or as transmission coils for wireless power transmission, as necessary.

The processor 1121 may identify a location of the recognized RFID tag and perform control to transmit wireless power to the home appliance through a working coil corresponding to the identified location.

Upon recognizing the RFID tag, the processor 1121 may perform control to make at least some of the plurality of working coils enter a wireless power transmission mode.

The received information may include information on a type and required power quantity of the home appliance. The processor 1121 may drive the inverter 1122 according to the information on the type and required power quantity of the home appliance.

In the case of a conventional wireless power transmission system of a wireless home appliance, in order to drive the wireless home appliance, first, a wireless power transmitter may transmit power and supply power to the wireless home appliance to activate a communication module.

The activated communication module may transmit information items of the wireless home appliance to the wireless power transmitter, check each other's information and, then, operate the wireless home appliance according to user requirements.

As described above, conventionally, a communication module for transmission and reception needs to be included in the wireless power transceiver.

When a module includes a plurality of wireless power transmitters, it is very difficult to check a transmitter of the plurality of transmitters, to which the wireless home appliance is coupled, during communication between the wireless home appliance and the wireless power transmitter.

In other words, when one wireless power transmitter uses a plurality of wireless home appliances, a type of a wireless home appliance placed on (coupled to) the transmitter and the number of wireless home appliances are obviously known but, in the case of a module including a plurality of wireless power transmitters, it is difficult to recognize a location of the wireless home appliance only via communication.

In addition, when a wireless home appliance has no unique power source and receives power through the wireless power receiver, if the wireless home appliance is not coupled to the wireless power receiver, the wireless power receiver needs to continuously transmit minimum power in order to continuously transmit minimum power of a wireless home appliance and, here, when the wireless home appliance is recognized is unknown.

When the wireless home appliance is coupled to the wireless power transmission coil, power may be wirelessly supplied and a communication module of the wireless home appliance may be activated and, then, the communication module may be in a state in which the communication module is capable of being used by a user.

The smart table according to an exemplary embodiment of the present invention may receive information including at least one of information corresponding to wireless home appliances, for example, a device type, required output, and a functional component (power ON/OFF, output adjustment, etc.) from an RFID tag.

When the RFID reader 1125 recognizes an RFID tag, the RFID reader 1125 may transmit corresponding wireless home appliance information to the processor 1121.

The processor 1121 may recognize a corresponding location as well as wireless home appliance information through RFID. When one or more wireless power transmission coils are present, a coil on which a wireless home appliance is positioned may be primarily determined through RFID and may be secondarily determined through a wireless power transmission coil.

According to the present invention, wireless power may be transmitted using a working coil of a device that does not include a separate transmission coil and has an induction heating cooking function using a magnetic induction phenomenon.

Accordingly, a separate additional module is not required and, thus, a multipurpose smart table may have a compact structure.

According to the present invention, RFID may be used for communication between a smart table and a wireless home appliance.

The RFID reader 1125 may recognize a coil to which a wireless home appliance of one or more wireless power transmission coils is coupled as well as receive information through RFID.

That is, the smart table may identify a location of a wireless power transmission coil corresponding to a wireless home appliance that is a wireless power receiver and drive only the corresponding wireless power transmission coil to supply wireless power without waste of power. In addition, radiated noise of electromagnetic waves may be minimized.

The processor 1121 may process information on the wireless home appliance and so on, provide the information to a user, and check operations.

According to an exemplary embodiment of the present invention, the wireless home appliance may include only an RFID tag and, thus, does not require additional communication modules, there achieving compact design of the wireless home appliance.

The RFID reader 1125 may include a plurality of antennas that may have one to one correspondence to the plurality of working coils.

As described with reference to FIGS. 7 to 9, the antenna of the RFID reader 1125 may be disposed on the working coil.

In this case, a spacer or a heat insulator may be disposed between the working coil and the antenna of the RFID reader 1125 for heat insulation from heat of the working coil and ensuring a gap.

The antenna of the RFID reader 1125 may be disposed between working coils that are configured as concentric circles in the working coils. That is, as illustrated in FIG. 10, an insert-type antenna form may be disposed in a gap between coils configured as concentric circles.

The RFID reader 1125 may poll at a predetermined period in order to recognize an RFID tag.

The smart table 1100 according to an exemplary embodiment of the present invention may further include a display 1124.

In this case, when at least one of the plurality of working coils operates as an induction heating coil, the processor 1121 may control the display 1124 to display an image indicating that cooking is currently underway.

Upon detecting movement of the home appliance, the processor 1121 may control the display 1124 to display a message indicating movement of the home appliance.

The display 1124 may be embodied as a touchscreen and may function as an input unit.

Upon detecting movement of the home appliance, the processor 1121 may change a working coil operating as the wireless power transmission coil according to the movement of the home appliance.

That is, when a home appliance is moved on the smart table, a working coil corresponding to a location to which the home appliance is moved may be set and driven as a wireless power transmission coil. In this case, a working coil that is not related to the location of the home appliance any longer among previously driven working coils may be turned off.

Upon detecting decoupling of the home appliance, the processor 1121 may turn power supply of the working coil operating as the wireless power transmission coil off.

Figure 12:
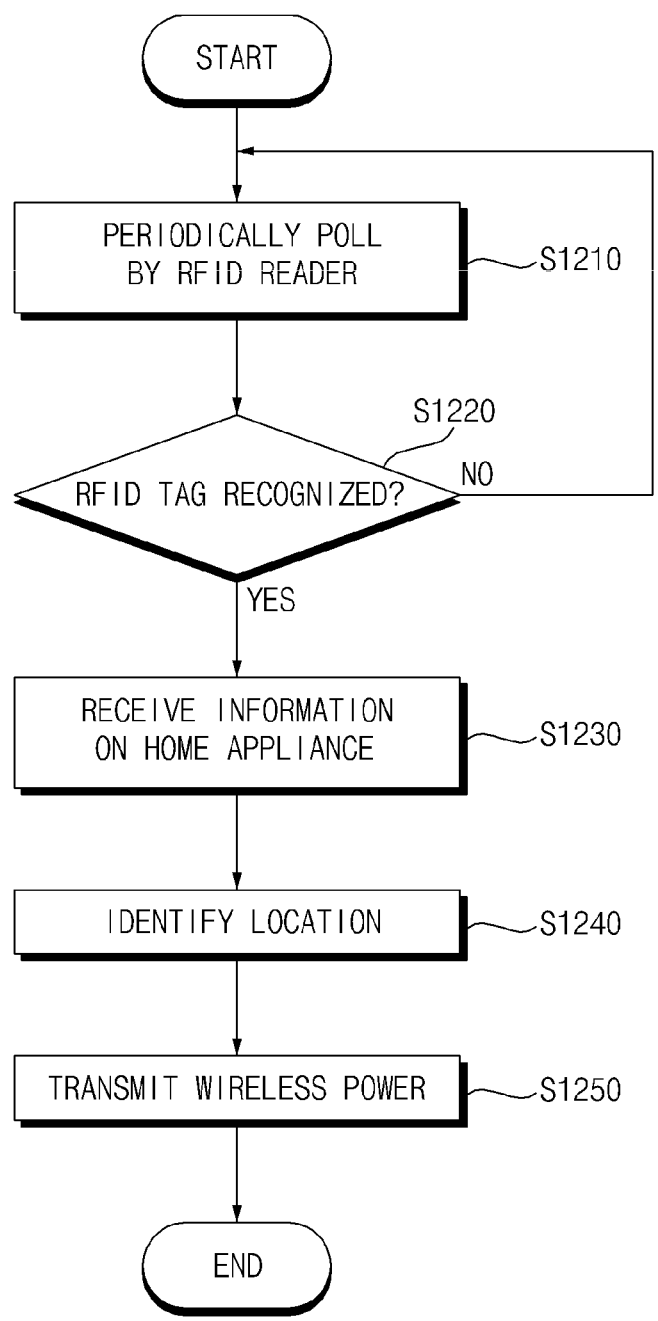
FIG. 12 is a flowchart of an operating method of a smart table according to an exemplary embodiment of the present invention.

FIG. 12 is a flowchart of an operating method of a smart table according to an exemplary embodiment of the present invention.

Referring to FIG. 12, an RFID reader may poll at a predetermined period (S1210) and, then, recognize an RFID tag of a home appliance placed on a plate (S1220).

The RFID reader may receive information of the home appliance from the RFID tag (S1230).

Here, the received information may include information on a type and required power quantity of the home appliance. In some embodiments, the received information may include information on a functional component of required output, power on/off, output adjustment, and so on as well as device type information.

The smart table according to an exemplary embodiment of the present invention may drive some of the plurality of working coils of the coil unit as working coils for induction heating or as transmission coils for wireless power transmission, as necessary.

The processor may drive one or more of the plurality of working coils as a wireless power transmission coil to transmit wireless power to the home appliance based on the received information (S1250).

The processor may identify a location of the recognized RFID tag based on an RFID antenna location in which the RFID tag is recognized and signal intensity from the RFID tag (S1240).

The processor may set and drive a working coil corresponding to the identified location of the RFID tag as the wireless power transmission coil.

That is, the working coil driven as the wireless power transmission coil may be a working coil corresponding to the determined location.

Figure 13:
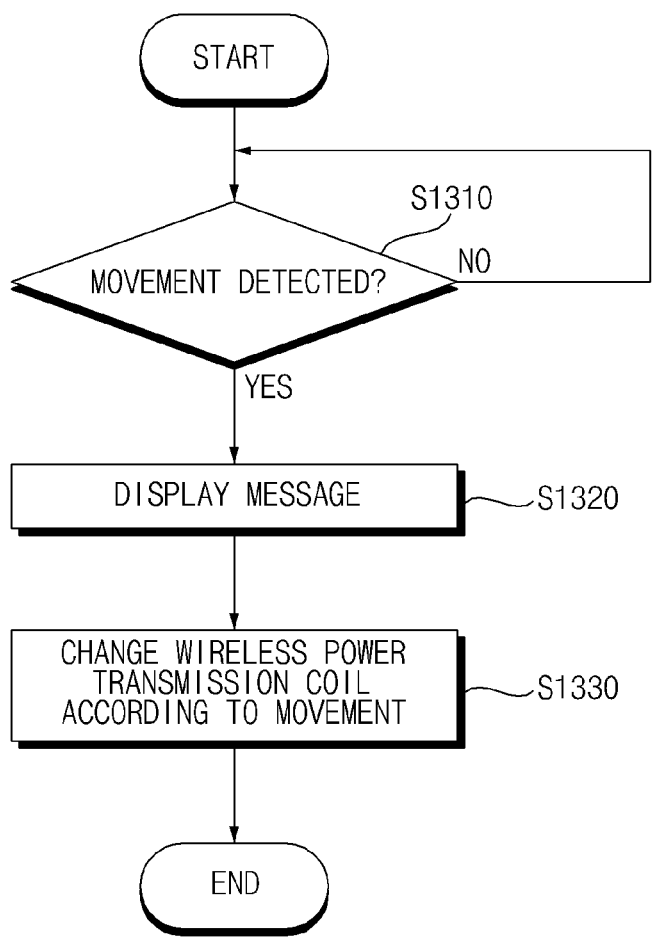
FIG. 13 is a flowchart of an operating method of a smart table according to an exemplary embodiment of the present invention.

FIG. 13 is a flowchart of an operating method of a smart table according to an exemplary embodiment of the present invention.

The processor may detect movement of the recognized RFID tag based on change in an RFID antenna that recognizes the RFID tag and signal intensity from the RFID tag.

Referring to FIG. 13, upon detecting movement of a home appliance (S1310), the processor may control a display to display a message indicating movement of the home appliance (S1320).

Upon detecting movement of a home appliance (S1310), the processor may change a working coil driven as the wireless power transmission coil according to the movement of the home appliance (S1330).

In some embodiments, according to movement of a home appliance, the processor may omit message display and may automatically change working coils.

When a home appliance is not detected at any portion of a working coil for transmitting wireless power, the processor may control the display to display decoupling of the home appliance.

Figure 14:
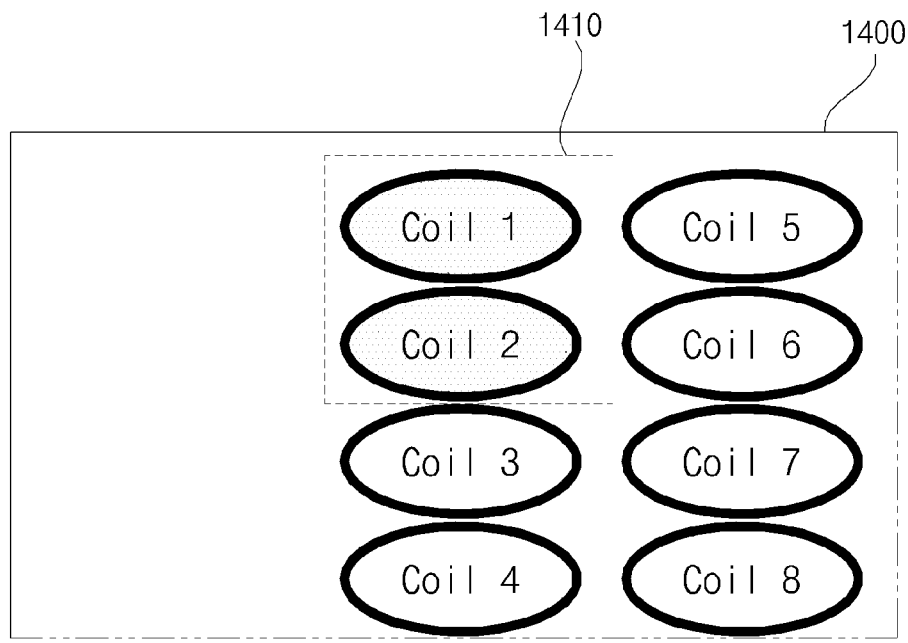
FIGS. 14 to 16 are diagrams for explanation of an operating method of a smart table according to an exemplary embodiment of the present invention.
Figure 15:
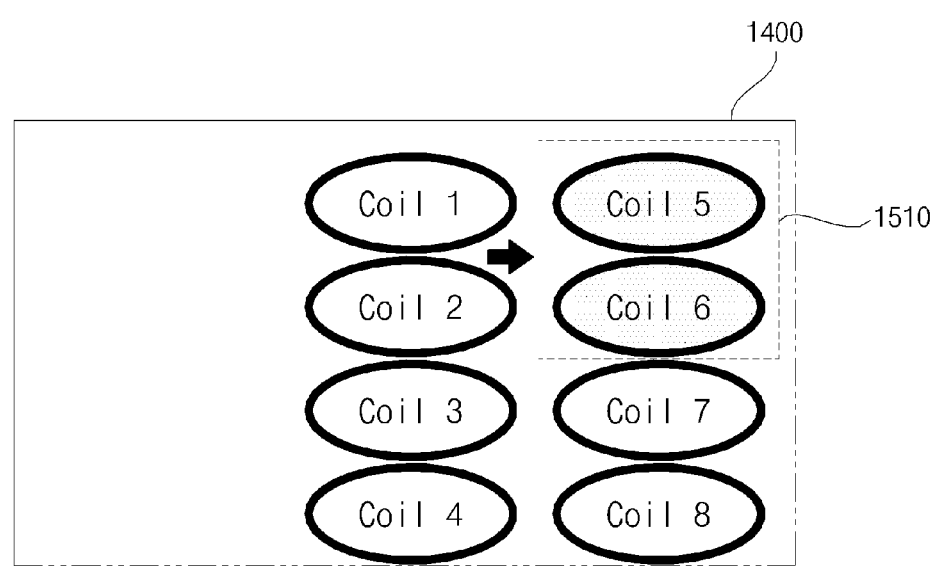
Figure 16:
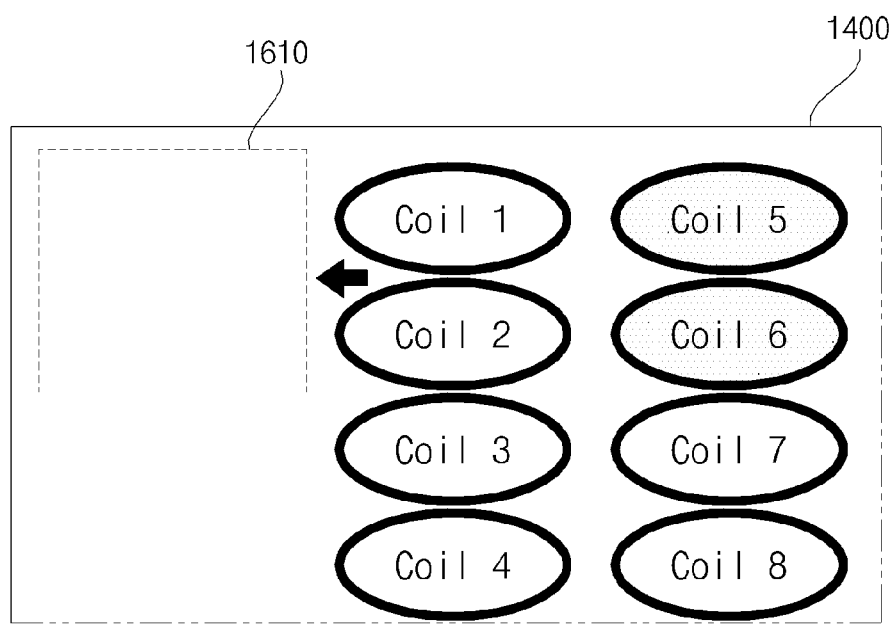

FIGS. 14 to 16 are diagrams for explanation of an operating method of a smart table according to an exemplary embodiment of the present invention.

The smart table according to an exemplary embodiment of the present invention may drive some of the plurality of working coils of the coil unit as working coils for induction heating or as transmission coils for wireless power transmission, as necessary.

Referring to FIG. 14, when an RFID tag of a wireless home appliance 1410 is recognized on coil 1 and coil 2 of a coil unit 1400, the coil 1 and the coil 2 may be driven as wireless power transmission coils.

Then, when the wireless home appliance is moved to the right, an RFID tag recognition location of a wireless home appliance 1510 that is moved to the right may be changed, as illustrated in FIG. 15.

The processor may identify working coils coil 5 and coil 6 corresponding to the wireless home appliance 1510 that is moved to the right.

The processor may change the wireless power transmission coil to the coil 5 and the coil 6. The processor may power off the coil 1 and the coil 2.

In addition, as illustrated in FIG. 16, when the wireless home appliance is moved to a region 1610 in which no working coil is disposed, the processor may power off the coil 1 and the coil 2.

At least one of exemplary embodiments of the present invention may provide a smart table having an induction heating cooking function and a wireless power transmission function.

According to at least one of exemplary embodiments of the present invention, the information and location of a home appliance may be identified and wireless power may be effectively supplied.

According to at least one of exemplary embodiments of the present invention, wireless power may be supplied even if a home appliance is moved.

According to at least one of exemplary embodiments of the present invention, a multipurpose smart table may advantageously have a compact structure.

According to at least one of exemplary embodiments of the present invention, an induction heating cooking function and a wireless power transmission function may be embodied at low cost and power consumption may be minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A smart table comprising:
   a plate;
   an inverter configured to convert direct current (DC) power into alternative current (AC) power and to supply the AC power;
   a coil unit disposed below the plate and comprising a plurality of working coils configured to be heated by the AC power;
   a radio frequency identification (RFID) reader configured to recognize an RFID tag of a home appliance placed on the plate and to receive information on the home appliance from the RFID tag, the RFID reader comprising an antenna disposed adjacent to at least one of the plurality of working coils;
   a spacer or an insulator that is disposed between the antenna of the RFID reader and the at least one of the plurality of working coils; and
   a processor configured to selectively drive one or more of the plurality of working coils (i) as wireless power transmission coils to perform control to transmit wireless power to the home appliance based on the received information or (ii) as working coils for induction heating to heat one or more objects disposed on the plate.

2. The smart table according to claim 1, wherein the processor identifies a location of the recognized RFID tag and performs control to transmit wireless power to the home appliance through a working coil corresponding to the identified location.

3. The smart table according to claim 1, wherein the received information comprises information on a type and required power quantity of the home appliance.

4. The smart table according to claim 1, wherein:
the RFID reader comprises a plurality of antennas; and
the plurality of antennas have one to one correspondence to the plurality of working coils.

5. The smart table according to claim 1, wherein the antenna of the RFID reader is disposed on at least one of the plurality of working coils.

6. The smart table according to claim 1, wherein the antenna of the RFID reader is disposed between coils that are configured as concentric circles in the at least one of the plurality of working coils.

7. The smart table according to claim 1, wherein the RFID reader polls at a predetermined period.

8. The smart table according to claim 1, wherein the processor is configured to, upon recognizing the RFID tag, perform control to make at least some of the plurality of working coils enter a wireless power transmission mode.

9. The smart table according to claim 1, further comprising a display,
wherein the processor controls the display to display a message indicating that cooking is currently underway when at least one of the plurality of working coils operates as an induction heating coil.

10. The smart table according to claim 1, further comprising a display,
wherein the processor controls the display to display a message indicating movement of the home appliance upon detecting movement of the home appliance.

11. The smart table according to claim 1, wherein the processor is configured to, upon detecting movement of the home appliance, change a working coil driven as the wireless power transmission coil according to movement of the home appliance.

12. The smart table according to claim 1, wherein the processor is configured to, upon detecting decoupling of the home appliance, perform control to turn power supply of the one or more of the plurality of working coils off.

13. The smart table according to claim 1, wherein the plurality of working coils are positioned at predetermined regions below the plate regardless of a purpose of induction heating or wireless power transmission.

14. The smart table according to claim 1, wherein the processor is further configured to drive one or more of the plurality of working coils as the power transmission coils for wireless power transmission and as the working coils for induction heating.

15. The smart table according to claim 1, wherein the processor is further configured to drive, as the working coils for induction heating, one or more of the plurality of working coils that have been driven as the power transmission coils for wireless power transmission.

16. The smart table according to claim 1, wherein the processor is further configured to drive, as the power transmission coils for wireless power transmission, one or more of the plurality of working coils that have been driven as the working coils for induction heating.

17. The smart table according to claim 1, wherein the spacer or the insulator has one surface facing the antenna of the RFID reader and the other surface facing the at least one of the plurality of working coils.

18. The smart table according to claim 1, wherein the spacer or the insulator defines a gap between the antenna of the RFID reader and the at least one of the plurality of working coils.

19. The smart table according to claim 5, wherein the antenna of the RFID reader is disposed vertically above the at least one of the plurality of working coils.

* * * * *